US012592030B2

(12) United States Patent
Gadelha et al.

(10) Patent No.: US 12,592,030 B2
(45) Date of Patent: Mar. 31, 2026

(54) INTERACTIVE THREE-DIMENSION AWARE TEXT-TO-IMAGE GENERATION

(71) Applicant: ADOBE INC., San Jose, CA (US)

(72) Inventors: Matheus Gadelha, San Jose, CA (US); Tomasz Opasinski, Los Angeles, CA (US); Kevin James Blackburn-Matzen, Seattle, WA (US); Mathieu Kevin Pascal Gaillard, San Jose, CA (US); Giorgio Gori, San Jose, CA (US); Radomir Mech, Mountain View, CA (US)

(73) Assignee: ADOBE INC., San Jose, CA (US)

( * ) Notice: Subject to any disclaimer, the term of this patent is extended or adjusted under 35 U.S.C. 154(b) by 153 days.

(21) Appl. No.: 18/451,267

(22) Filed: Aug. 17, 2023

(65) Prior Publication Data

US 2025/0061650 A1     Feb. 20, 2025

(51) Int. Cl.
| | |
|---|---|
| *G06T 17/00* | (2006.01) |
| *G06F 3/0482* | (2013.01) |
| *G06T 7/50* | (2017.01) |
| *G06T 19/00* | (2011.01) |
| *G06T 19/20* | (2011.01) |

(52) U.S. Cl.
CPC ............ *G06T 17/00* (2013.01); *G06F 3/0482* (2013.01); *G06T 7/50* (2017.01); *G06T 19/003* (2013.01); *G06T 19/20* (2013.01); *G06T 2207/10028* (2013.01)

(58) Field of Classification Search
CPC ......... G06T 17/00; G06T 7/50; G06T 19/003; G06T 19/20; G06T 2207/10028; G06F 3/0482
See application file for complete search history.

(56) References Cited

U.S. PATENT DOCUMENTS

| | | |
|---|---|---|
| 2021/0374904 A1 | 12/2021 | Liao et al. |
| 2023/0118966 A1* | 4/2023 | Liu ......................... G10L 13/02 |
| | | 345/473 |
| 2024/0312166 A1 | 9/2024 | Kasahara et al. |
| 2024/0355064 A1 | 10/2024 | Skrypnyk et al. |
| 2025/0078347 A1 | 3/2025 | Couleaud et al. |

FOREIGN PATENT DOCUMENTS

CN      115496863 A  *  12/2022

OTHER PUBLICATIONS

XOPixel ("Design 3D Text Scene in Adobe Dimension", 2020, https://www.youtube.com/watch?v=Z2i0mn_Q_40) (Year: 2020).*

(Continued)

*Primary Examiner* — Xin Sheng

(74) *Attorney, Agent, or Firm* — F. CHAU & ASSOCIATES, LLC

(57) ABSTRACT

An image processing system is configured to receive a three-dimensional (3D) model and a text prompt that describes a scene corresponding to the 3D model. The system may then generate a depth map of the 3D model and generate an output image based on the depth map and the text prompt. The output image may depicts a view of the scene that includes textures described by the text prompt. The output image may be generated using an image generation model.

16 Claims, 10 Drawing Sheets

(56) References Cited

OTHER PUBLICATIONS

Chen, Dave Zhenyu, et al. "Text2tex: Text-driven texture synthesis via diffusion models." Proceedings of the IEEE/CVF international conference on computer vision. 2023. (Year: 2023).*

Saharia, et al., "Photorealistic Text-to-Image Diffusion Models with Deep Language Understanding", arXiv preprint arXiv:2205.11487v1 [cs.CV] May 23, 2022, 46 pages.

Ramesh, et al., "Hierarchical Text-Conditional Image Generation with CLIP Latents", arXiv preprint arXiv:2204.06125v1 [cs.CV] Apr. 13, 2022, 27 pages.

Yu, et al., "Scaling Autoregressive Models for Content-Rich Text-to-Image Generation", arXiv preprint arXiv:2206.10789v1 [cs.CV] Jun. 22, 2022, 49 pages.

Liu, et al., "Infinite Nature: Perpetual View Generation of Natural Scenes from a Single Image", ICCV 2021, pp. 14458-14467, 2021, 10 pages.

Genova, et al., "Unsupervised Training for 3D Morphable Model Regression", arXiv preprint arXiv:1806.06098v1 [cs.CV] Jun. 15, 2018, 20 pages.

Xiang, et al., "3D-aware Image Generation using 2D Diffusion Models", arXiv preprint arXiv:2303.17905v1 [cs.CV] Mar. 31, 2023, 20 pages.

Fridman, et al., "SceneScape: Text-Driven Consistent Scene Generation", arXiv preprint arXiv:2302.01133v2 [cs.CV] May 30, 2023, 17 pages.

Office Action dated Sep. 23, 2025 in related U.S. Appl. No. 18/481,719.

* cited by examiner

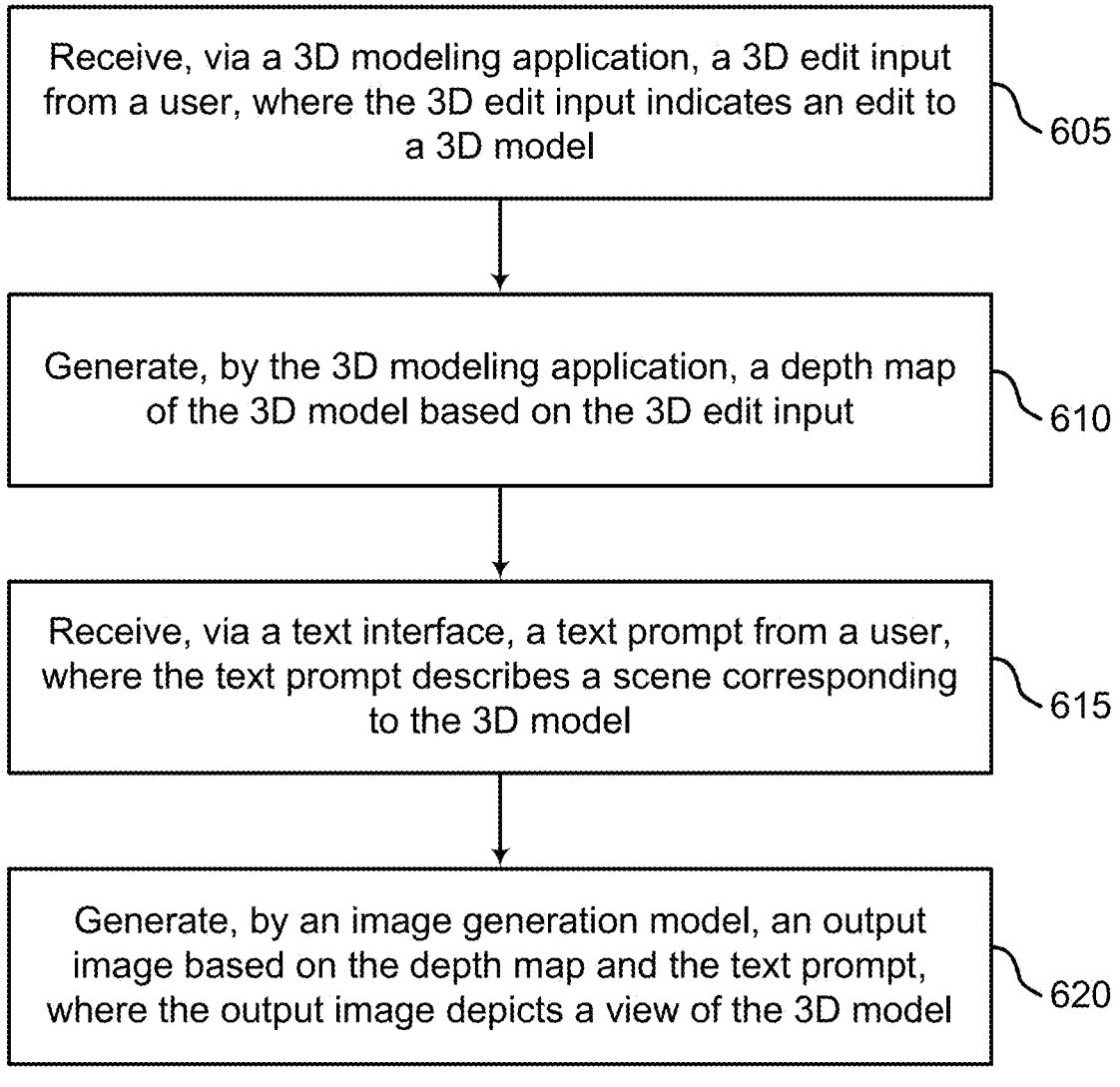

Receive, via a 3D modeling application, a 3D edit input from a user, where the 3D edit input indicates an edit to a 3D model ⌇605

Generate, by the 3D modeling application, a depth map of the 3D model based on the 3D edit input ⌇610

Receive, via a text interface, a text prompt from a user, where the text prompt describes a scene corresponding to the 3D model ⌇615

Generate, by an image generation model, an output image based on the depth map and the text prompt, where the output image depicts a view of the 3D model ⌇620

Figure 10:
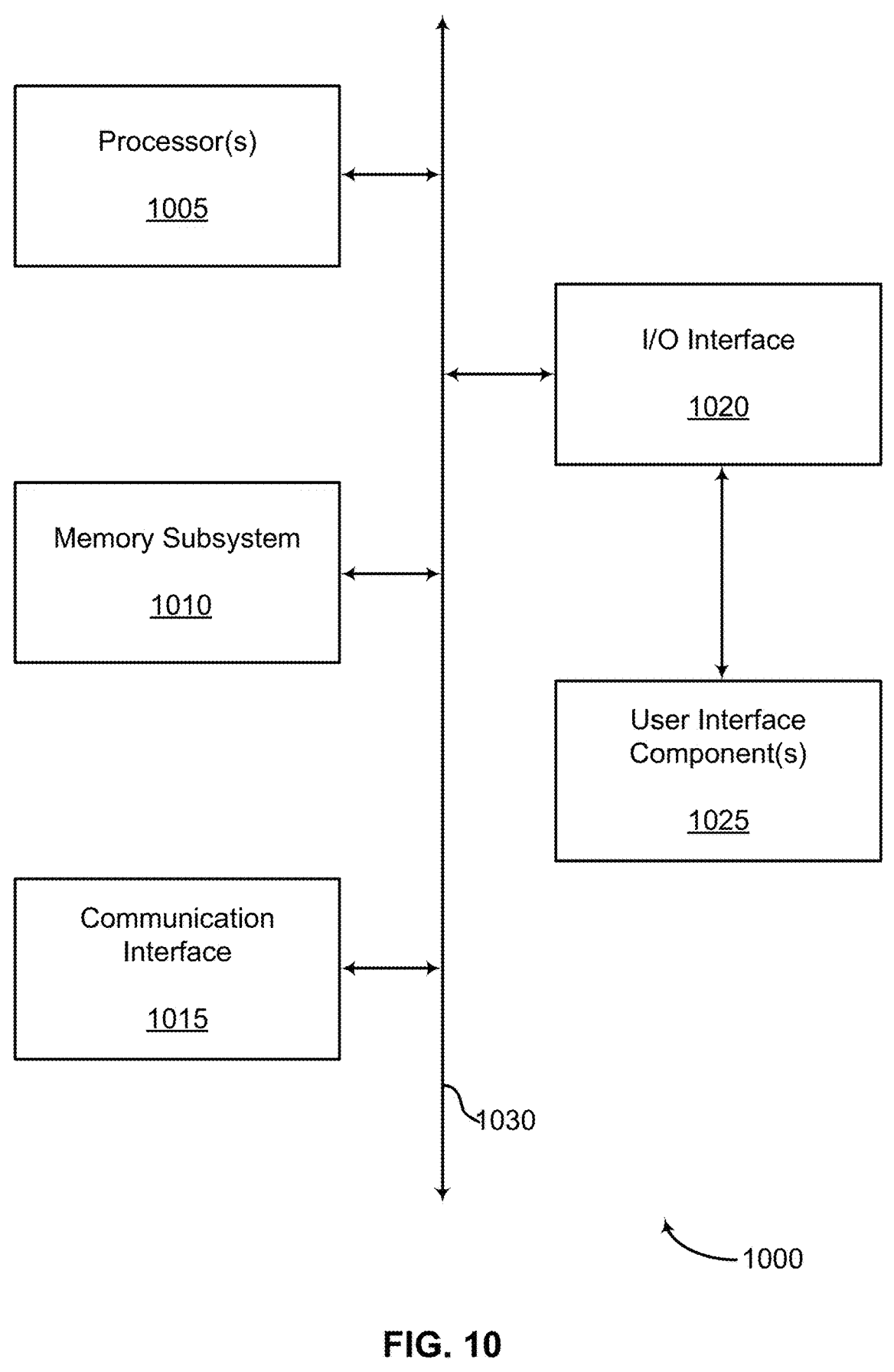

Processor(s)

1005

I/O Interface

1020

Memory Subsystem

1010

User Interface
Component(s)

1025

Communication
Interface

INTERACTIVE THREE-DIMENSION AWARE TEXT-TO-IMAGE GENERATION

BACKGROUND

The following relates generally to image processing, and more specifically to interactive three-dimension (3D) aware text-to-image generation. Image processing or digital image processing generally refers to the use of a computer to process a digital image (e.g., to edit or synthesize an image) using an algorithm or a processing network. Image processing technologies have become increasingly important in various fields including photography, video processing, and computer vision, among other examples. Image generation is a subfield of image processing that may include various tasks to generate image content, to fill in missing or damaged (e.g., inaccurate) parts of an image with plausible content, etc. In some cases, a neural network or a machine learning model may be used to generate an image based on a source image or other user input such as a text prompt.

SUMMARY

The present disclosure describes systems and methods for image processing. Embodiments of the disclosure include an image processing system configured to generate an image, e.g., based text information and three-dimensional (3D) geometry information provided by a user. As described herein, image processing systems can generate aesthetically pleasing images from text prompts and 3D scenes provided by a user (e.g., by rendering a 3D scene geometry as a depth map and using a text-guided conditional image generative model).

For instance, a method, apparatus, and non-transitory computer readable medium for image processing (e.g., for interactive 3D aware text-to-image generation) are described. One or more aspects of the method, apparatus, and non-transitory computer readable medium include receiving a 3D model and a text prompt that describes a scene corresponding to the 3D model; generating a depth map of the 3D model; and generating, by an image generation model, an output image based on the depth map and the text prompt, wherein the output image depicts a view of the 3D model.

An apparatus and method for interactive three-dimension aware text-to-image generation are described. One or more aspects of the apparatus and method include at least one processor; at least one memory storing instructions and in electronic communication with the at least one processor; a 3D modeling application configured to generate a depth map of a 3D model; an image generation model configured to generate an output image based on the depth map and a text prompt, wherein the output image depicts a view of the 3D model.

BRIEF DESCRIPTION OF THE DRAWINGS

FIG. 6 shows an example of a method for image processing according to aspects of the present disclosure.

FIG. 10 shows an example of a computing device according to aspects of the present disclosure.

DETAILED DESCRIPTION

The present disclosure relates to three-dimensional (3D) image processing. Image processing generally refers to the use of a computer to edit a digital image using an algorithm or a processing network. Many conventional image processing tools and software are catered to highly specialized tasks. For example, text-guided image generation models (e.g., text-2-image neural network models) may be designed for the generation of images based on user provided text input. However, generating accurate and aesthetically pleasing images from text prompts alone can be challenging, as it may be difficult to convey the desired visual details through text. As a result, conventional systems may not offer high quality output for certain applications such as depiction of scenes with specific 3D features. Accordingly, users may struggle to achieve desired results.

The present disclosure describes efficient and user-friendly image processing systems configured to generate accurate (e.g., user intended) images using text information and 3D scene geometry information provided by a user. For example, a user may provide 3D image generation information (e.g., a user may create/edit a 3D scene via a 3D modeling application equipped with 3D controls), which may be rendered as a depth map. Image processing systems may use the generated depth maps along with user provided text prompts to generate output images. For instance, image processing systems may use a conditional image generative model along with user provided text prompts to generate output images following (e.g., that adhere to) the scene geometry conveyed via generated depth maps. As described in more detail herein, such image processing systems and image processing techniques may combine the geometric precision of 3D modeling with the powerful (e.g., versatile, flexible, etc.) capabilities of text-guided image generation models. As such, users may more efficiently create high-quality text-guided images according to accurate and reliable 3D modeling constraints (e.g., such that image processing systems may generate output images that more closely resemble shapes, scenes, and geometries intended by the user).

Embodiments of the present disclosure can be used in the context of various image processing (e.g., image generation) applications. For example, an image processing system based on the present disclosure takes user input, including 3D geometry information and text prompt information, to efficiently generate output images. Example embodiments of the present disclosure in the context of image processing systems are described with reference to FIGS. 1 through 4. Details regarding example image generation processes are provided with reference to FIGS. 5 through 9.

3D Image Processing Systems

Figure 1:
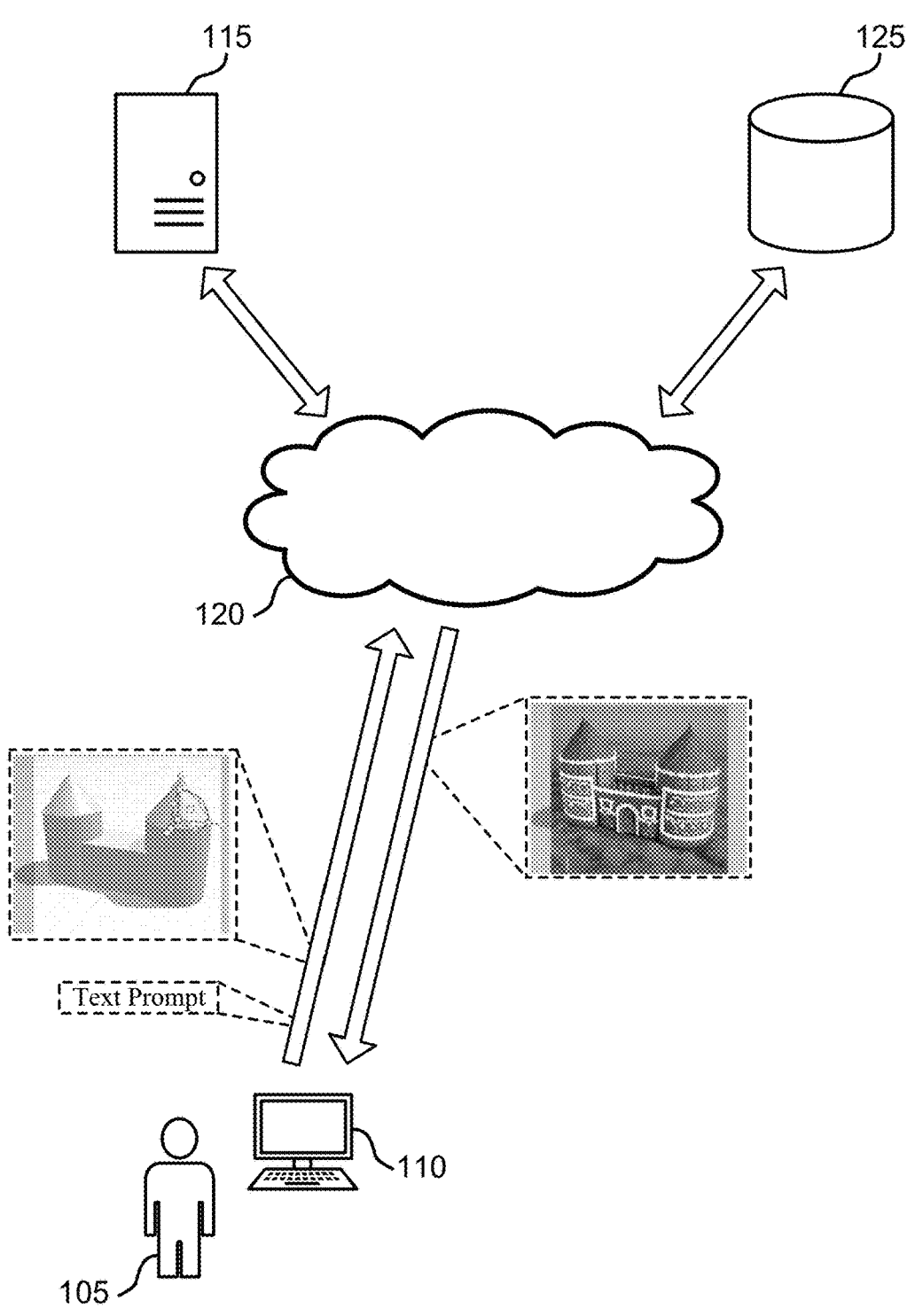
FIGS. 1 through 4 show examples of an image processing system according to aspects of the present disclosure.

FIG. 1 shows an example of an image processing system 100 according to aspects of the present disclosure. The example image processing system 100 shown includes user 105, user device 110, server 115, cloud 120, and database 125. Image processing system 100 is an example of, or includes aspects of, the corresponding element described with reference to FIGS. 2-4.

The present disclosure provides image generation systems and image processing techniques that are efficient, accurate, and user-friendly. As an example shown in FIG. 1, image processing system 100 may generate output images (e.g., a castle made of gingerbread cookie) based on user 105 provided inputs including geometry information (e.g., 3D modeling information, such as a 3D model of a castle) and text information (e.g., a text prompt, such as "gingerbread castle"). As described in more detail below, the image processing system 100 may include user device 110, server 115, cloud 120, and database 125, which may perform and/or support one or more aspects of the image processing system 100.

Conventional image processing systems (e.g., conventional text-guided image generation tools) do not offer the ability for users 105 to precisely configure geometry (e.g., shape, 3D appearance, etc.) of images to be generated. For example, to configure specific shape or geometric appearance of generated output images, conventional text-guided image generation tools may require that a user specify aspects of intended shapes or geometric appearance via text, which may be challenging (e.g., specifying 3D geometric intention using words may be difficult, time-consuming, require lengthy text descriptions, demand intimate knowledge of a vast range of vocabulary, etc.).

Accordingly, the systems and techniques described herein enable user workflows for creating aesthetically pleasing images (e.g., red green blue (RGB) images) from text prompts and geometry information (e.g., 3D scenes). For example, 3D scenes may be used to endow the user with 3D-aware controls (e.g., that are otherwise challenging to describe through text). User 105 intent (e.g., geometric constraints) may be efficiently represented in a 3D environment. Moreover, text prompts may be used to describe appearance and generate details, textures, etc. that may be laborious to come up with in 3D. The image processing systems described herein, such as image processing system 100, may thus allow users 105 to assemble a scene in a 3D modeling application to convey geometry information for image generation (e.g., users 105 may convey geometry information via a 3D canvas, which may be fully equipped with 3D controls such that users 105 may rotate, scale, and translate 3D objects, add simple primitives, import complex meshes, etc.).

Geometry information (e.g., a user provided/edited 3D scene) may be rendered as a depth map, which may be used as an input to a conditional image generative model, along with text information (e.g., a text prompt, text description, etc.). In some aspects, users 105 may also configure view inputs (e.g., such as configuring the position of a virtual camera, such that the depth map is generated based on the camera view of the 3D scene). The image processing system 100 (e.g., the generative model of the system) may then create an output image in accordance with the geometry information (e.g., the scene geometry provided by the user 105 via a 3D modeling application) and text information (e.g., the textual guidance provided by the user 105 via a text prompt or text description).

In some aspects, image processing system 100 may use machine learning artificial intelligence (AI) for generating image information. An artificial neural network (ANN) is a hardware or a software component that includes a number of connected nodes (i.e., artificial neurons), which loosely correspond to the neurons in a human brain. Each connection, or edge, transmits a signal from one node to another (like the physical synapses in a brain). When a node receives a signal, it processes the signal and then transmits the processed signal to other connected nodes. In some cases, the signals between nodes comprise real numbers, and the output of each node is computed by a function of the sum of its inputs. In some examples, nodes may determine their output using other mathematical algorithms (e.g., selecting the max from the inputs as the output) or any other suitable algorithm for activating the node. Each node and edge is associated with one or more node weights that determine how the signal is processed and transmitted.

During the training process, these weights are adjusted to improve the accuracy of the result (i.e., by minimizing a loss function which corresponds in some way to the difference between the current result and the target result). The weight of an edge increases or decreases the strength of the signal transmitted between nodes. In some cases, nodes have a threshold below which a signal is not transmitted at all. In some examples, the nodes are aggregated into layers. Different layers perform different transformations on their inputs. The initial layer is known as the input layer and the last layer is known as the output layer. In some cases, signals traverse certain layers multiple times."

A generative adversarial network (GAN) is an ANN in which two neural networks (e.g., a generator and a discriminator) are trained based on a contest with each other. For example, the generator learns to generate a candidate by mapping information from a latent space to a data distribution of interest, while the discriminator distinguishes the candidate produced by the generator from a true data distribution of the data distribution of interest. The generator's training objective is to increase an error rate of the discriminator by producing novel candidates that the discriminator classifies as "real" (e.g., belonging to the true data distribution). Therefore, given a training set, the GAN learns to generate new data with similar properties as the training set. For example, a GAN trained on photographs can generate new images that look authentic to a human observer. GANs may be used in conjunction with supervised learning, semi-supervised learning, unsupervised learning, and reinforcement learning.

For example, some aspects of output image generation by image processing system 100 may include generating (e.g., drawing) segmentation maps, manipulating scenes, labeling segments with labels (e.g., such as sky, sea, sand, snow, etc.), among other processing tasks. In some examples, image processing system 100 may allow/enable the user 105 to control a generative model workflow through the use of semantic maps (e.g., via GauGAN, pix2pixHD, etc.). For instance, users 105 may draw sketches of a desired scene (e.g., via a 3D modeling application, etc.), and image processing system 100 may automatically generate semantic labels to describe the various objects and elements in the scene drawn by the user 105. A generative model (e.g., image generation model 230) of image processing system 100 may then use this information to create a realistic image (e.g., in accordance with the scene and semantic labels).

In some aspects, image processing system 100 may include predefined classes of objects (e.g., such as basic shapes, landscapes, furniture, cars, etc., via BlockGAN, GIRAFFE, etc.) that allow/enable the user 105 to provide geometry information leveraging such predefined objects. However, in addition to such predefined objects, image processing system 100 enables finer control of shapes, camera placements, etc. (e.g., which enables users 105 to create more complex, diverse, and precise geometry information/scenes). As such, 3D modeling applications (e.g., including full 3D controls) allow users 105 to create scenes that are not restricted to specific classes of objects and enables users 105 to adjust the camera placement to their liking, among other examples.

User device 110 may provide the interface for user 105 interaction with image processing system 100. User device 110 may be a personal computer, laptop computer, mainframe computer, palmtop computer, personal assistant, mobile device, or any other suitable processing apparatus. In some examples, the user device 110 includes software that incorporates an image processing application (e.g., an image generation application). The image processing application may either include or communicate with server 115. In some examples, the image generation application on user device 110 may include functions of server 115.

A user interface may enable user 105 to interact with user device 110. In some embodiments, the user interface may include various input devices (e.g., remote-control devices interfaced with the user interface directly or through an I/O controller module, audio devices (e.g., such as an external speaker system), external display devices (e.g., such as a display screen), etc. In some cases, a user interface may be a graphical user interface (GUI). In some examples, a user interface may be represented in code which is sent to the user device 110 and rendered locally by a browser. Generally, user device 110 may enable the user 105 to provide geometry information and/or text information to image processing system 100, as described in more detail herein. For instance, in some aspects, user device 110 may include a combined interface for geometry information and/or text information to image processing system 100 (e.g., as described in more detail herein, for example, with reference to FIGS. 2 and 4).

In some aspects, server 115 provides one or more functions to users 105 linked by way of one or more of the various networks. In some cases, server 115 includes a single microprocessor board, which includes a microprocessor responsible for controlling all aspects of the server. In some cases, a server 115 uses microprocessor and protocols to exchange data with other devices/users on one or more of the networks via hypertext transfer protocol (HTTP), and simple mail transfer protocol (SMTP), although other protocols such as file transfer protocol (FTP), and simple network management protocol (SNMP) may also be used. In some cases, server 115 is configured to send and receive hypertext markup language (HTML) formatted files (e.g., for displaying web pages).

In various embodiments, a server 115 comprises a general-purpose computing device, a personal computer, a laptop computer, a mainframe computer, a supercomputer, or any other suitable processing apparatus. For example, server 115 may include a processor unit, a memory unit, an I/O module, etc. In some aspects, server 115 may include a computer implemented network. Server 115 may communicate with database 125 via cloud 120. In some cases, the architecture of the image processing network may be referred to as a network or a network model.

Cloud 120 is a computer network configured to provide on-demand availability of computer system resources, such as data storage and computing power. In some examples, cloud 120 provides resources without active management by user 105. The term cloud is sometimes used to describe data centers available to many users 105 over the Internet. Some large cloud networks have functions distributed over multiple locations from central servers. A server is designated an edge server if it has a direct or close connection to a user 105. In some cases, cloud 120 is limited to a single organization. In other examples, cloud 120 is available to many organizations. In one example, cloud 120 includes a multilayer communications network comprising multiple edge routers and core routers. In another example, cloud 120 is based on a local collection of switches in a single physical location.

Database 125 is an organized collection of data. For example, database 125 stores data in a specified format known as a schema. Database 125 may be structured as a single database, a distributed database, multiple distributed databases, or an emergency backup database. In some cases, a database controller may manage data storage and processing in database 125. In some cases, a user interacts with a database controller. In other cases, a database controller may operate automatically without user interaction. In some embodiments, database 125 is external to server 115 and communicates with server 115 via cloud 120.

Figure 2:
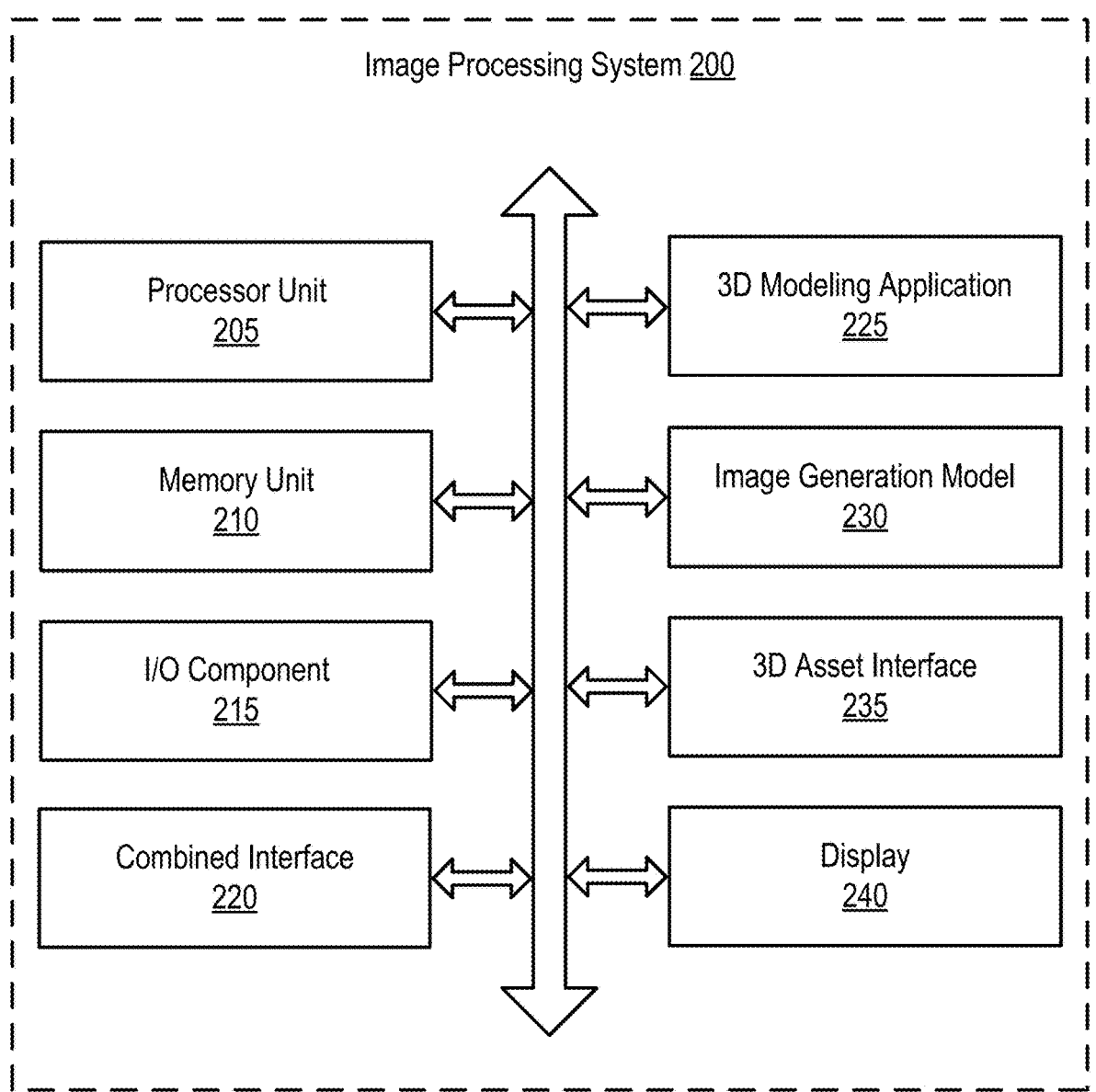

FIG. 2 shows an example of an image processing system 200 according to aspects of the present disclosure. In one aspect, image processing system 200 includes processor unit 205, memory unit 210, I/O component 215, combined interface 220, 3D modeling application 225, image generation model 230, 3D asset interface 235, and display 240. Image processing system 200 is an example of, or includes aspects of, the corresponding element described with reference to FIGS. 1, 3, and 4. In some implementations, image processing system 200 may be implemented as user device 110 or as server 115 (e.g., where components of image processing system 200, and operations performed by image processing system 200, may implemented on either the user device 110 or the server 115). In some implementations, image processing system 200 may be implemented via a combination of user device 110, server 115, database 120, and cloud 125 (e.g., where components of image processing system 200, and operations performed by image processing system 200, may be distributed across the user device 110, server 115, database 120, and cloud 125 according to various configurations). As described in more detail herein, image processing system 200 may be implemented for various image generation applications (e.g., for interactive 3D aware text-to-image generation).

A processor unit 205 is an intelligent hardware device, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or any combination thereof). In some aspects, the processor unit 205 is configured to operate a memory unit 210 (e.g., a memory array using a memory controller). In other cases, a memory controller is integrated into processor unit 205. In some cases, processor unit 205 is configured to execute computer-readable instructions stored in a memory unit 210 to perform various functions. In some embodiments, processor unit 205 includes special purpose components for modem processing, baseband processing, digital signal processing, or transmission processing.

Examples of a memory unit 210 (e.g., a memory device) include random access memory (RAM), read-only memory (ROM), or a hard disk. Examples of memory units 210 include solid state memory and a hard disk drive. In some examples, memory unit 210 is used to store computer-readable, computer-executable software including instructions that, when executed, cause a processor unit 205 to perform various functions described herein. In some cases, the memory unit 210 contains, among other things, a basic input/output system (BIOS) which controls basic hardware or software operation such as the interaction with peripheral components or devices. In some cases, a memory controller operates memory cells. For example, the memory controller can include a row decoder, column decoder, or both. In some cases, memory cells within a memory unit 210 store information in the form of a logical state.

An I/O component 215 (e.g., an I/O controller) may manage input and output signals for a device. I/O component 215 may also manage peripherals not integrated into a device. In some cases, an I/O component 215 may represent a physical connection or port to an external peripheral. In some cases, an I/O component 215 may utilize an operating system such as iOS®, ANDROID®, MS-DOS®, MS-WINDOWS®, OS/2®, UNIX®, LINUX®, or another known operating system. In other cases, an I/O component 215 may represent or interact with a modem, a keyboard, a mouse, a touchscreen, or a similar device. In some cases, an I/O component 215 may be implemented as part of a processor unit 205. In some cases, a user may interact with a device via I/O component 215 or via hardware components controlled by an I/O component 215.

A combined interface 220 may enable a user to interact with a device and/or image processing system 200. In some embodiments, the combined interface 220 may include an input device (e.g., remote control device interfaced with the user interface directly or through an I/O component 215), an external display 240 device (e.g., such as a display 240 screen), an audio device (e.g., such as an external speaker system), etc. In some cases, a combined interface may be a GUI. As described in more detail herein, combined interface 220 may include a text interface (e.g., which may enable a user to input text prompts to the image processing system 200), a 3D modeling environment (e.g., which may enable a user to input 3D edit inputs), etc.

A neural network is a type of computer algorithm that is capable of learning specific patterns without being explicitly programmed, but through iterations over known data. A neural network may refer to a cognitive model that includes input nodes, hidden nodes, and output nodes. Nodes in the network may have an activation function that computes whether the node is activated based on the output of previous nodes. Training the system may involve supplying values for the inputs and modifying edge weights and activation functions (algorithmically or randomly) until the result closely approximates a set of desired outputs.

In some aspects, image generation model 230 may include a neural processing unit (NPU). In some examples, image generation model 230 may include, or may be implemented via, a microprocessor that specializes in the acceleration of machine learning algorithms. For example, image generation model 230 may operate on predictive models such as ANNs or random forests (RFs). In some cases, an NPU may be designed in a way that makes it unsuitable for general purpose computing such as that performed by a CPU. Additionally or alternatively, the software support for an NPU may not be developed for general purpose computing.

According to some aspects, combined interface 220 receives, via a text interface, a text prompt from a user, where the text prompt describes a scene corresponding to the 3D model. In some examples, combined interface 220 is a combined text interface and 3D modeling interface (e.g., for the 3D modeling application 225 and the image generation model 230), where the combined interface 220 includes the text interface.

According to some aspects, 3D modeling application 225 receives a 3D edit input from a user, where the 3D edit input indicates an edit to a 3D model. In some examples, 3D modeling application 225 generates, by the 3D modeling application 225, a depth map of the 3D model based on the 3D edit input. In some aspects, the 3D edit input includes a rotation or a translation of the 3D shape. In some aspects, the 3D model includes a textureless model (e.g., a model without bump maps, a less detailed model, etc.). In some aspects, the 3D model includes a set of 3D shapes, and where each of the 3D shapes includes a different color. In some examples, 3D modeling application 225 receives a view input. In some examples, 3D modeling application 225 determines a camera view of the 3D model based on the view input, where the depth map is based on the camera view (e.g., based on the perspective view).

According to some aspects, image generation model 230 generates, by an image generation model 230, an output image based on the depth map and the text prompt, where the output image depicts a view of the 3D model. In some examples, image generation model 230 generates a set of output images. In some aspects, the output image is generated using a reverse diffusion process. In some aspects, the output image includes a 2D rendering of the 3D model. Image generation model 230 is an example of, or includes aspects of, the corresponding element described with reference to FIG. 3.

According to some aspects, 3D asset interface 235 ads a 3D shape into the 3D model using the 3D modeling application 225. In some examples, 3D asset interface 235 displays a set of 3D shapes to the user using a 3D asset interface 235. In some examples, 3D asset interface 235 receives a selection input via the 3D asset interface 235, where the 3D shape is added based on the 3D selection input. 3D asset interface 235 is an example of, or includes aspects of, the corresponding element described with reference to FIG. 4.

According to some aspects, display 240 displays a preview of the set of output images. A display 240 may comprise a conventional monitor, a monitor coupled with an integrated display, an integrated display (e.g., an LCD display), or other means for viewing associated data or processing information. Output devices other than the display 240 can be used, such as printers, other computers or data storage devices, and computer networks.

Figure 3:
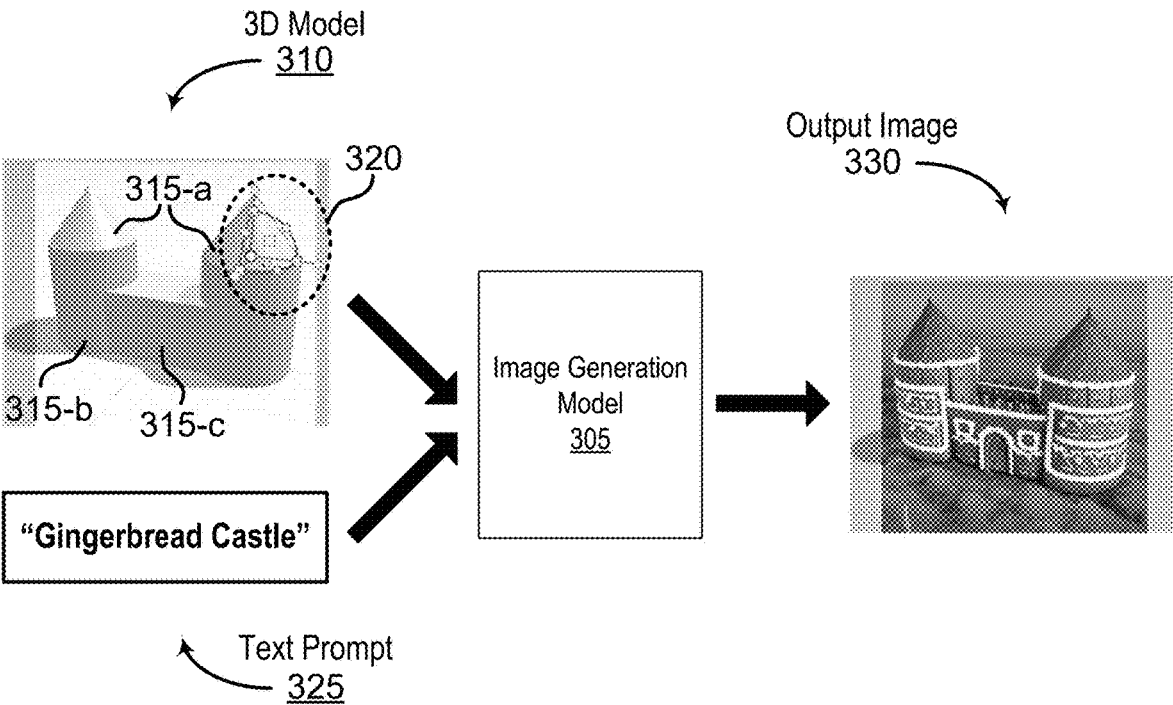

FIG. 3 shows an example of an image processing system 300 according to aspects of the present disclosure. In one aspect, image processing system 300 includes image generation model 305, 3D model 310, text prompt 325, and output image 330. Image processing system 300 is an example of, or includes aspects of, the corresponding element described with reference to FIGS. 1, 2, and 4. Image generation model 305 is an example of, or includes aspects of, the corresponding element described with reference to FIG. 2. In one aspect, 3D model 310 includes shapes 315 and edit 320. 3D model 310 is an example of, or includes aspects of, the corresponding element described with reference to FIG. 4. Shapes 315 is an example of, or includes aspects of, the corresponding element described with reference to FIG. 4. Text prompt 325 is an example of, or includes aspects of, the corresponding element described with reference to FIG. 4. Output image 330 is an example of, or includes aspects of, the corresponding element described with reference to FIG. 4.

Image processing system 300 may illustrate image generation model 305 generating output image 330 based on 3D model 310 and text prompt 325, according to one or more aspects of the present disclosure. For example, a user may provide geometry information to image generation model 310 via creating or editing 3D model 310 (e.g., using a 3D modeling application, as described with reference to, for example, FIGS. 2 and 4). For instance, a user may provide a 3D model 310 including various shapes 315, and the user may manipulate the various shapes 315 via various edits 320 that may be performed, as described in more detail herein. In the example of FIG. 3, 3D model 310 may resemble a castle via a configuration of two cone shapes 315-*a*, two cylinder shapes 315-*b* and a cuboid 315-*c*. Accordingly, in this example, a user may convey geometry information to image generation model 305 via 3D model 310 (e.g., based on the configuration of shapes 315 and edits 320 to the 3D model 310). Moreover, a user may provide text information to image generation model 305 via text prompts 325. As such, in the example of FIG. 3, a user may provide a 3D model 310 and a text prompt 325, such that image generation model 305 may generate an output image 330 of a gingerbread castle, according to the user provided geometry information and text information.

As such, image processing system 300 may generate aesthetically pleasing RGB images from text prompts 325 that are accurate in accordance with user intention based on user provided 3D scenes (e.g., 3D models 310). Users may create a 3D scene (e.g., 3D model 310) in a canvas equipped with 3D controls, and the image processing system 300 may render the scene (e.g., 3D model 310) as a depth map. Using image generation model 305 (e.g., a conditional image generative model) and a text description (e.g., text prompt 325), image processing system 300 may generate an RGB image following the scene geometry and textual guidance. Accordingly, image processing system 300 enables efficient workflows that provide users with a powerful tool for creating high-quality images, combining the geometric precision of 3D modeling with the flexibility of text prompts.

As described herein, a user may provide geometry information for image generation by creating or editing a 3D scene (e.g., 3D model 310) using a canvas equipped with 3D controls (e.g., where 3D controls may allow users to perform various 3D edits 320, which may include rotations of objects/shapes 315, scaling of objects/shapes 315, non-uniform scaling of objects/shapes 315, translation of objects/shapes 315, adding simple primitives, importing complex meshes, etc.). Image processing system 300 renders the user provided 3D model 310 as a depth map, which provides information about the scene's geometry. Along with the depth map, a text prompt 325 may be provided as input to image generation model 305 (e.g., a conditional image generative model).

The image generation model 305 uses the depth map (e.g., generated based on 3D model 310) and text prompt 325 to create an output image 330 (e.g., a RGB image) that follows the scene geometry and textual guidance. To achieve this, the image generation model 305 may understand and interpret text prompt 325 and incorporate it into the image generation process. Additionally, the image generation model 305 may generate textures and details (e.g., based on text prompt 325) that may otherwise be difficult for the user to provide using only 3D modeling.

In some aspects, the image generation model 305 may be conditioned to remove noise (e.g., denoise) based on both text (e.g., text prompt 325) and depth (e.g., depth maps rendered via 3D model 310). Image generation model 305 may include various Depth-to-RGB generative models. In some aspects, image generation model 305 may include aspects including, or similar to, blender, 3Ds max, Maya, etc., among various other models, however the systems and techniques described herein are not limited thereto, and others may be used by analogy, without departing from the scope of the present disclosure.

Figure 4:
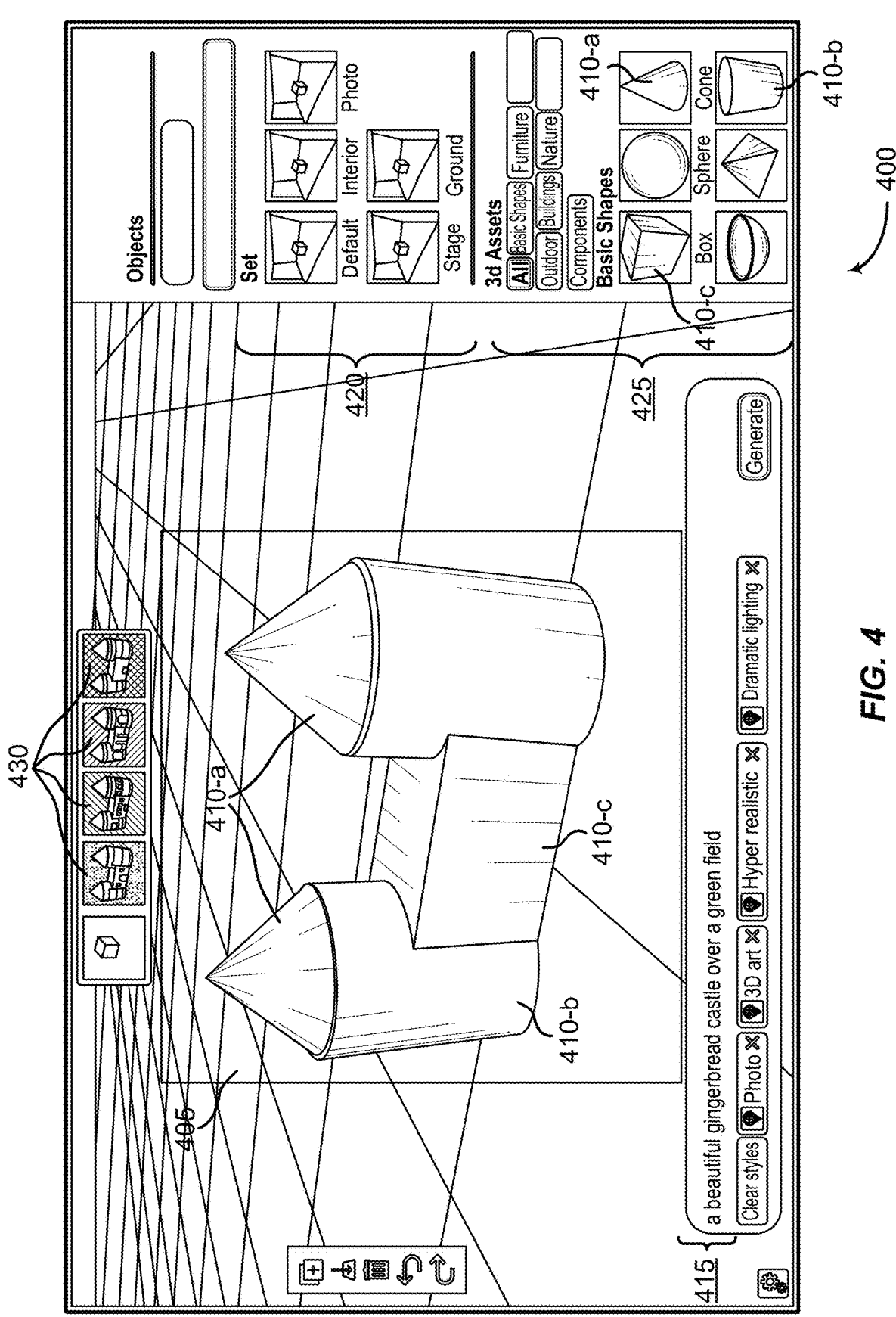

FIG. 4 shows an example of an image processing system 400 according to aspects of the present disclosure. In one aspect, image processing system 400 includes 3D model 405, text prompt 415, view input 420, 3D asset interface 425, and output image 430. Image processing system 400 is an example of, or includes aspects of, the corresponding element described with reference to FIGS. 1-3. In one aspect, 3D model 405 includes shapes 410. 3D model 405 is an example of, or includes aspects of, the corresponding element described with reference to FIG. 3. Shapes 410 is an example of, or includes aspects of, the corresponding element described with reference to FIG. 3. Text prompt 415 is an example of, or includes aspects of, the corresponding element described with reference to FIG. 3. 3D asset interface 425 is an example of, or includes aspects of, the corresponding element described with reference to FIG. 2. Output image 430 is an example of, or includes aspects of, the corresponding element described with reference to FIG. 3.

As described herein, generating aesthetically pleasing images (e.g., desirable images, user intended images, etc.) from text prompts can be challenging (e.g., as it may be difficult to convey the desired visual details through text alone). The systems and techniques described herein enable workflows that leverage geometry information (e.g., 3D model 405) and text information (e.g., text prompt 415), allowing users to efficiently create high-quality images from text prompts and simplified 3D scenes (e.g., where objects/ shapes 410 may not necessarily be very detailed, without requiring significant expertise in 3D modeling and/or text to image generation prompting, etc.).

For instance, FIG. 4 shows an example image processing system 400 (e.g., which may show aspects of a 3D modeling application, a display instance of a 3D modeling application, etc.). In some aspects, image processing system 400 shows aspects of a combined interface described herein. For instance, a user may interact with the image processing system 400 to provide input including text prompts 415 (e.g., via a text interface of a combined interface, such as the example shown in FIG. 4) and geometry information such as 3D model 405 (e.g., via a combined interface of a 3D modeling application, such as the example shown in FIG. 4).

As described in more detail herein, a user may provide a 3D model 405 (e.g., a user may create a 3D model 405 and/or edit a 3D model 405, as described herein, for example, with reference to FIG. 3). For instance, image processing system 400 may display 3D shapes 410 to the user via a 3D asset interface 425. In the example of FIG. 4, the 3D model 405 may resemble a castle via a configuration of two cone shapes 410-*a*, two cylinder shapes 410-*b* and a cuboid 410-*c*. Accordingly, in this example, a user may convey geometry information to an image generation model via 3D model 405 (e.g., based on the configuration of shapes 410, based on any edits to the 3D model 405, etc.). In some aspects, the image processing system 400 may receive a selection input via the 3D asset interface 425, where the 3D shapes 410 may be added based on the 3D selection input. In the example of FIG. 4, a user may select two cone shapes 410-*a*, two cylinder shapes 410-*b* and a cuboid 410-*c* via the 3D asset interface 425 and may input various edits via the 3D modeling application to configure/edit the shapes 410 into the desired 3D model 405. In some examples, different shapes 410 may be represented using different colors (e.g., to facilitate efficient configuration/editing by a user). For example, each of shapes 410-*a*, 410-*b*, and 410-*c* may be represented using different colors.

Moreover, in some cases, a user may provide text information input via text prompts 415. Further, a user may provide a view input 420. For instance, image processing system 400 may determine a camera view of the 3D model 405 based on a user provided view input 420 (e.g., where the image processing system 400 may render depth maps based on the view input 420 and the 3D model 405). In some cases, view inputs 420 may include, or configure, a camera view, a direction, a focal length, etc.

Based on the user provided inputs (e.g., the 3D model 405, text prompt 415, view input 420, etc.), image processing system 400 may generate a plurality of output images 430 and display a preview of the plurality of output images 430. The example image processing system 400 is shown for illustrative purposes and is not intended to be limiting in terms of the scope of the present disclosure. For example, an image processing system 400 may include object inputs, style inputs, appearance inputs, crop inputs, shape edit inputs (e.g., rotation, translation, etc.), among various other inputs. In some embodiments, image processing system 400 (e.g., a 3D modeling application) may include an input (e.g., such as a slider, multiple options to select from, a digital input box, etc.) for configuring the strictness for which the 3D model 405 is to be adhered to for generation of the output images 430. For instance, an image generation model may generate output images 430 based on rendered depth maps and a user provided parameter configuring the extent to which the depth maps are adhered to.

In some aspects, 3D model 410 may be a textureless model (e.g., a model without bump maps, a model without certain surface properties, a less detailed model, etc.). For instance, according to the present disclosure, text prompts 415 may be used to provide texture to generate output image 430 (e.g., rather than a user creating texture, which may be difficult, time consuming, and require user expertise). Accordingly, the present disclosure enables more efficient techniques for adding texture to 3D models 405, as well as for generating output images 430 that include texture via text prompts 415 and adhere to user provided geometry information. For instance, text prompts 415 may be used to generate image content otherwise corresponding granular details (e.g., fine characteristics) of shapes in 3D modelling (e.g., such as textures, carpet threads, wrinkles, etc.). In some aspects, image processing systems may use text prompts 415 to generate image content such as wrapping 2D images around 3D models 405 and determining how light would affect it in the generated output images 430.

Image Generation

Figure 5:
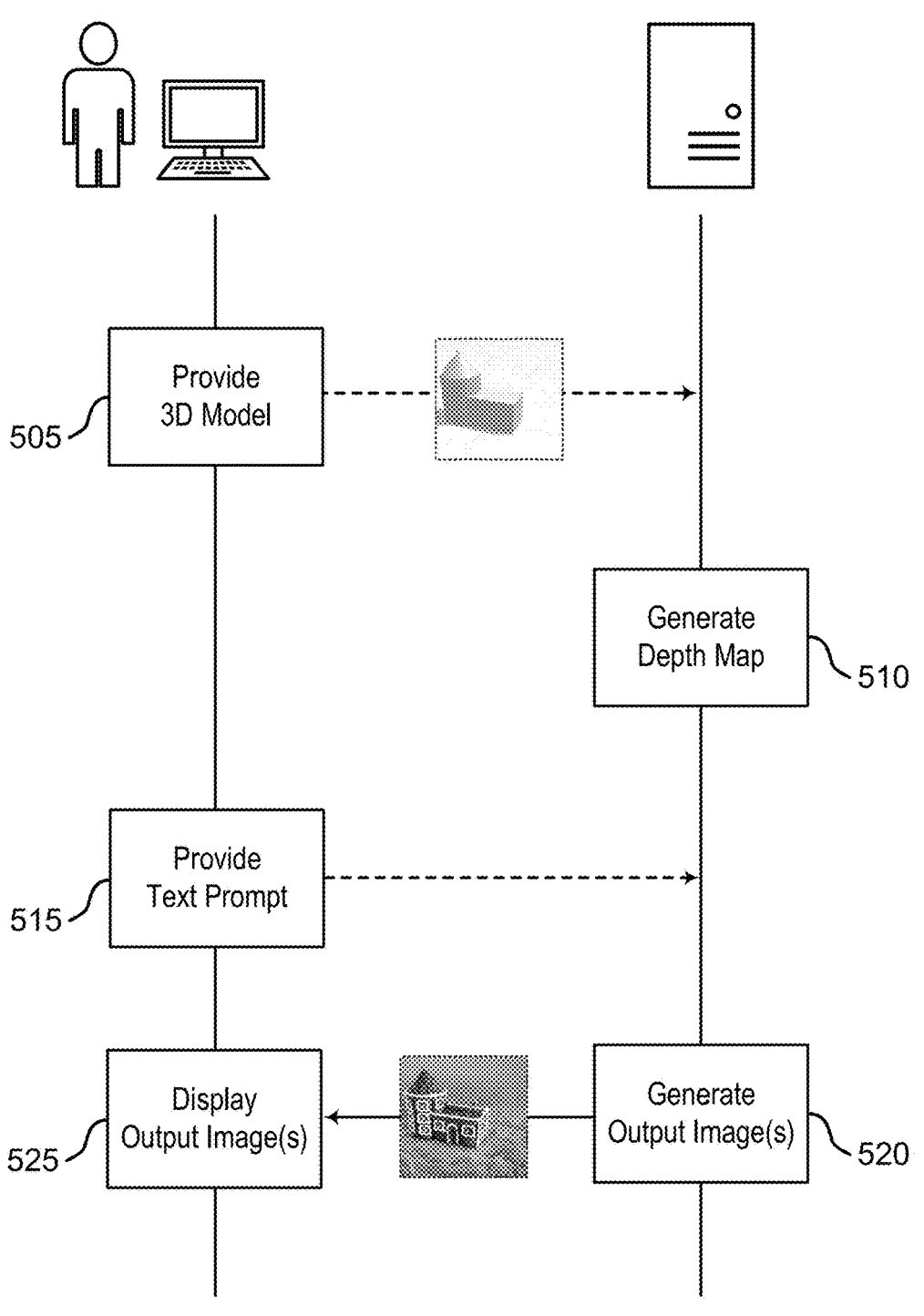
FIG. 5 shows an example of a method for image generation according to aspects of the present disclosure.

FIG. 5 shows an example of a method 500 including image generation processes according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 505, the system provides a 3D model (e.g., a user may provide a 3D model and/or some 3D edit input indicating an edit to a 3D model). In some cases, the operations of this step refer to, or may be performed by, an image processing system as described with reference to FIGS. 1-4. In some cases, the operations of this step refer to, or may be performed by, a 3D modeling application as described with reference to FIG. 2. In some cases, the operations of this step refer to, or may be performed by, a user as described with reference to FIG. 1.

At operation 510, the system generates a depth map (e.g., a depth map of the 3D model based on the 3D edit input). In some cases, the operations of this step refer to, or may be performed by, an image processing system as described with reference to FIGS. 1-4. In some cases, the operations of this step refer to, or may be performed by, a 3D modeling application as described with reference to FIG. 2.

At operation 515, the system provides a text prompt (e.g., a user may provide a text prompt describing a scene corresponding to the 3D model). In some cases, the operations of this step refer to, or may be performed by, an image processing system as described with reference to FIGS. 1-4. In some cases, the operations of this step refer to, or may be performed by, a 3D modeling application as described with reference to FIG. 2. In some cases, the operations of this step refer to, or may be performed by, a user as described with reference to FIG. 1.

At operation 520, the system generates an output image (e.g., where the output image may depict a view of the provided 3D model based on the depth map and the text prompt). In some cases, the operations of this step refer to, or may be performed by, an image processing system as described with reference to FIGS. 1-4. In some cases, the operations of this step refer to, or may be performed by, an image generation model as described with reference to FIGS. 2 and 3.

At operation 525, the system displays the output image. In some cases, the operations of this step refer to, or may be performed by, an image processing system as described with reference to FIGS. 1-4. In some cases, the operations of this step refer to, or may be performed by, a 3D modeling application as described with reference to FIG. 2. In some cases, the operations of this step refer to, or may be performed by, a display as described with reference to FIG. 2.

FIG. 6 shows an example of a method 600 for image processing according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 605, the system receives a 3D edit input from a user, where the 3D edit input indicates an edit to a 3D model. In some cases, the operations of this step refer to, or may be performed by, a 3D modeling application as described with reference to FIG. 2.

At operation 610, the system generates, by the 3D modeling application, a depth map of the 3D model based on the 3D edit input. In some cases, the operations of this step refer to, or may be performed by, a 3D modeling application as described with reference to FIG. 2.

At operation 615, the system receives, via a text interface, a text prompt from a user, where the text prompt describes a scene corresponding to the 3D model. In some cases, the operations of this step refer to, or may be performed by, a combined interface as described with reference to FIG. 2.

At operation 620, the system generates, by an image generation model, an output image based on the depth map and the text prompt, where the output image depicts a view of the 3D model. In some cases, the operations of this step refer to, or may be performed by, an image generation model as described with reference to FIGS. 2 and 3.

Accordingly, methods, apparatuses, and non-transitory computer readable medium for interactive three-dimension aware text-to-image generation are described. One or more aspects of the methods, apparatuses, and non-transitory computer readable medium include receiving, via a 3D modeling application, a 3D edit input from a user, wherein the 3D edit input indicates an edit to a 3D model; generating, by the 3D modeling application, a depth map of the 3D model based on the 3D edit input; receiving, via a text interface, a text prompt from a user, wherein the text prompt describes a scene corresponding to the 3D model; and generating, by an image generation model, an output image based on the depth map and the text prompt, wherein the output image depicts a view of the 3D model.

Some examples of the methods, apparatuses, and non-transitory computer readable medium further include adding a 3D shape into the 3D model using the 3D modeling application. In some aspects, the 3D edit input comprises a rotation or a translation of the 3D shape. Some examples of the methods, apparatuses, and non-transitory computer readable medium further include displaying a plurality of 3D shapes to the user using a 3D asset interface. Some examples further include receiving a selection input via the 3D asset interface, wherein the 3D shape is added based on the 3D selection input.

Some examples of the methods, apparatuses, and non-transitory computer readable medium further include providing a combined interface for the 3D modeling application and the image generation model, wherein the combined interface includes the text interface. Some examples of the methods, apparatuses, and non-transitory computer readable medium further include generating a plurality of output images. Some examples further include displaying a preview of the plurality of output images.

In some aspects, the 3D model comprises a textureless model. In some aspects, the output image is generated using a reverse diffusion process. In some aspects, the output image comprises a 2D rendering of the 3D model. In some aspects, the 3D model comprises a plurality of 3D shapes, and wherein each of the 3D shapes comprises a different color.

Some examples of the methods, apparatuses, and non-transitory computer readable medium further include receiving a view input. Some examples further include determining a camera view of the 3D model based on the view input, wherein the depth map is based on the camera view (e.g., based on a perspective view).

Diffusion Models

Figure 7:
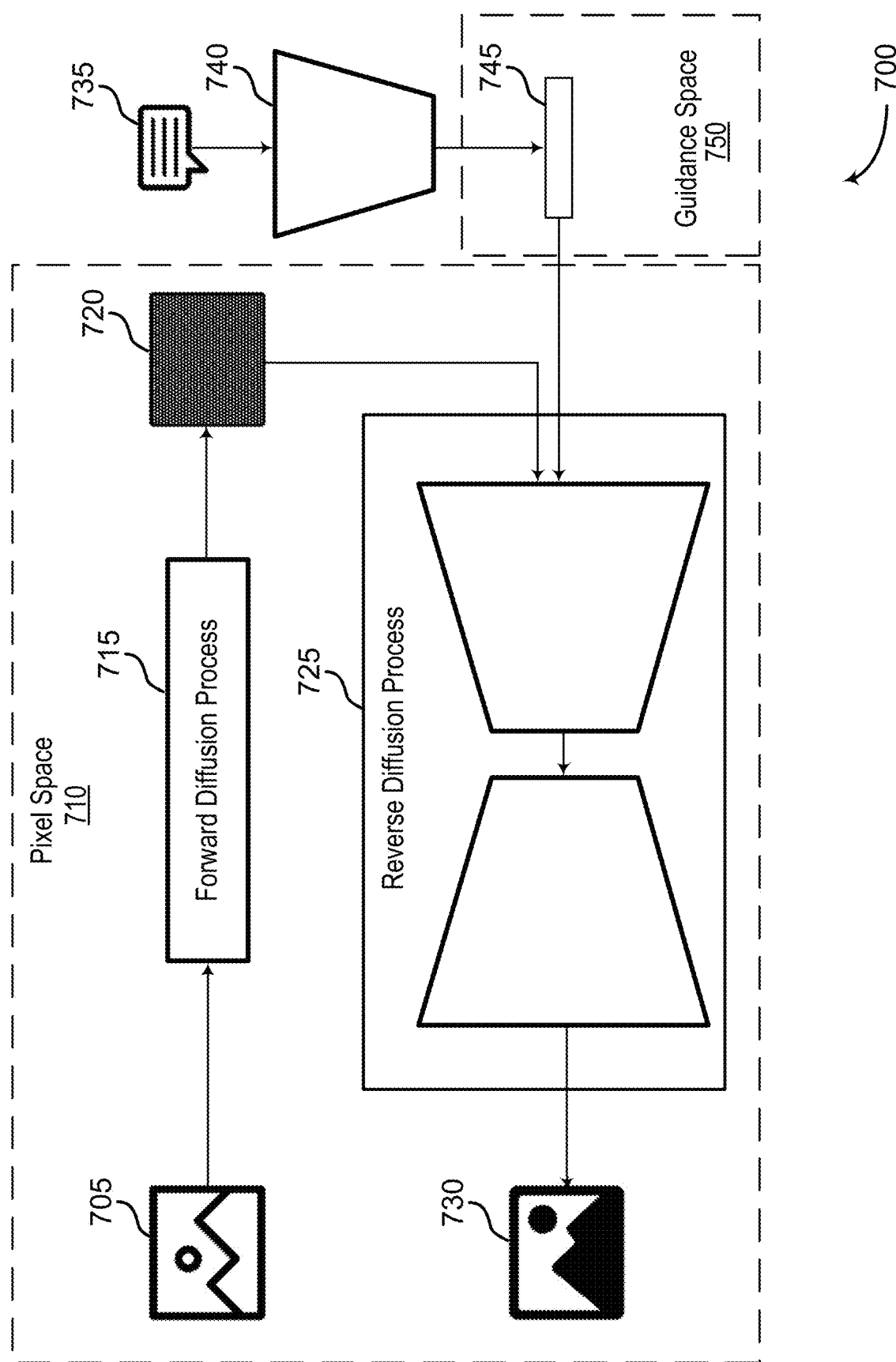
FIG. 7 shows an example of a guided diffusion model according to aspects of the present disclosure.

FIG. 7 shows an example of a guided diffusion model 700 according to aspects of the present disclosure. The guided latent diffusion model 700 depicted in FIG. 7 is an example of, or includes aspects of, the corresponding element described with reference to FIGS. 2-4.

Diffusion models are a class of generative neural networks which can be trained to generate new data with features similar to features found in training data. In particular, diffusion models can be used to generate novel images. Diffusion models can be used for various image generation tasks including image super-resolution, generation of images with perceptual metrics, conditional generation (e.g., generation based on text guidance), image inpainting, and image manipulation.

Types of diffusion models include Denoising Diffusion Probabilistic Models (DDPMs) and Denoising Diffusion Implicit Models (DDIMs). In DDPMs, the generative process includes reversing a stochastic Markov diffusion process. DDIMs, on the other hand, use a deterministic process so that the same input results in the same output. Diffusion models may also be characterized by whether the noise is added to the image itself, or to image features generated by an encoder (i.e., latent diffusion).

Diffusion models work by iteratively adding noise to the data during a forward process and then learning to recover the data by denoising the data during a reverse process. For example, during training, guided latent diffusion model 700 may take an original image 705 in a pixel space 710 as input and apply forward diffusion process 730 to gradually add noise to the original image 705 to obtain noisy images 720 at various noise levels.

Next, a reverse diffusion process 725 (e.g., a U-Net ANN) gradually removes the noise from the noisy images 720 at the various noise levels to obtain an output image 730. In some cases, an output image 730 is created from each of the various noise levels. The output image 730 can be compared to the original image 705 to train the reverse diffusion process 725.

The reverse diffusion process 725 can also be guided based on a text prompt 735, or another guidance prompt, such as an image, a layout, a segmentation map, etc. The text prompt 735 can be encoded using a text encoder 765 (e.g., a multimodal encoder) to obtain guidance features 745 in guidance space 750. The guidance features 745 can be combined with the noisy images 720 at one or more layers of the reverse diffusion process 725 to ensure that the output image 730 includes content described by the text prompt 735. For example, guidance features 745 can be combined with the noisy features using a cross-attention block within the reverse diffusion process 725.

Figure 8:
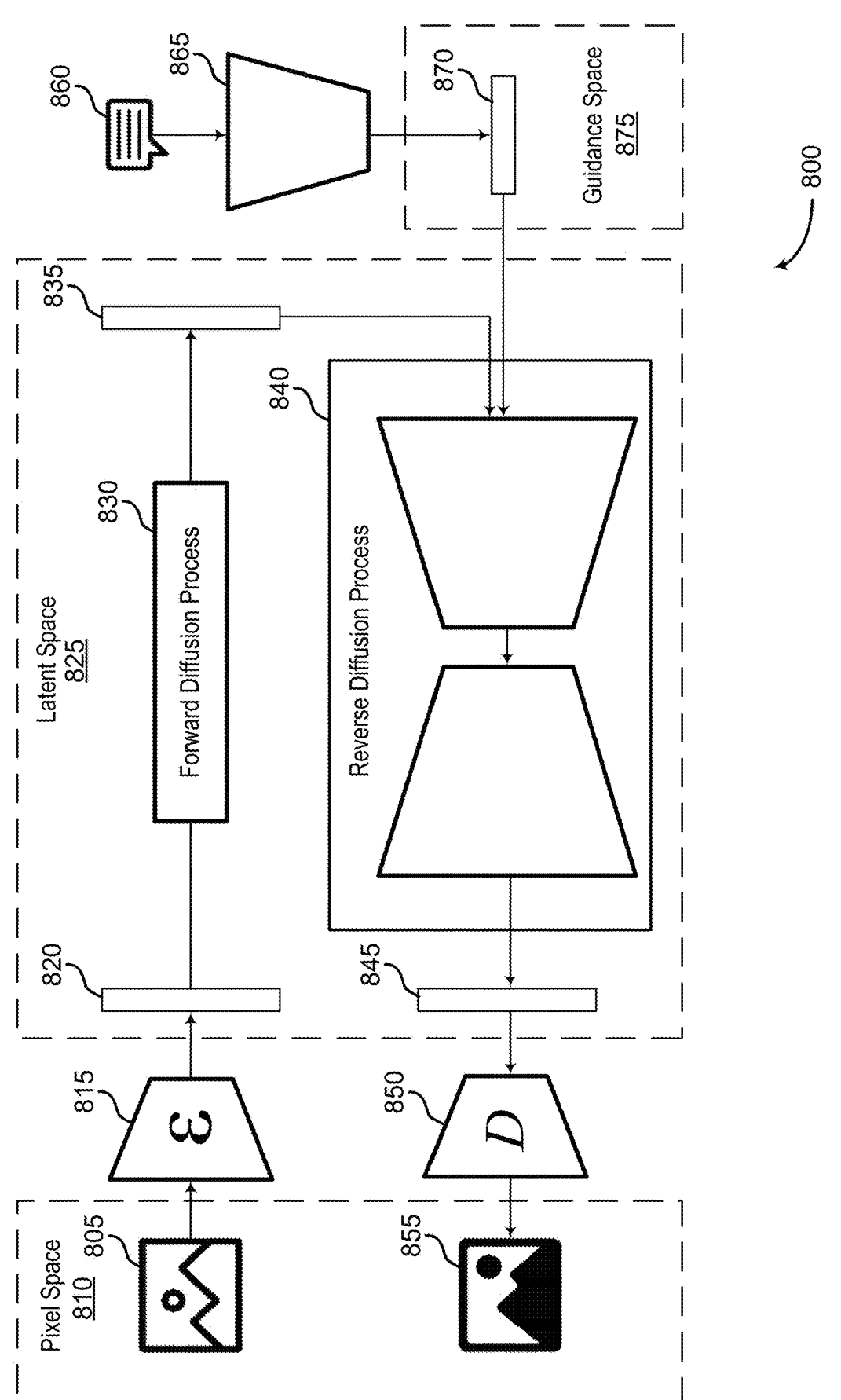
FIG. 8 shows an example of a guided diffusion model according to aspects of the present disclosure.

FIG. 8 shows an example of a guided latent diffusion model 800 according to aspects of the present disclosure. The guided latent diffusion model 800 depicted in FIG. 8 is an example of, or includes aspects of, the corresponding element described with reference to FIGS. 2-4.

Diffusion models are a class of generative neural networks which can be trained to generate new data with features similar to features found in training data. In particular, diffusion models can be used to generate novel images. Diffusion models can be used for various image generation tasks including image super-resolution, generation of images with perceptual metrics, conditional generation (e.g., generation based on text guidance), image inpainting, and image manipulation.

Types of diffusion models include Denoising Diffusion Probabilistic Models (DDPMs) and Denoising Diffusion Implicit Models (DDIMs). In DDPMs, the generative process includes reversing a stochastic Markov diffusion process. DDIMs, on the other hand, use a deterministic process so that the same input results in the same output. Diffusion models may also be characterized by whether the noise is added to the image itself, or to image features generated by an encoder (i.e., latent diffusion).

Diffusion models work by iteratively adding noise to the data during a forward process and then learning to recover the data by denoising the data during a reverse process. For example, during training, guided latent diffusion model 800 may take an original image 805 in a pixel space 810 as input and apply and image encoder 815 to convert original image 805 into original image features 820 in a latent space 825. Then, a forward diffusion process 830 gradually adds noise to the original image features 820 to obtain noisy features 835 (also in latent space 825) at various noise levels.

Next, a reverse diffusion process 840 (e.g., a U-Net ANN) gradually removes the noise from the noisy features 835 at the various noise levels to obtain denoised image features 845 in latent space 825. In some examples, the denoised image features 845 are compared to the original image features 820 at each of the various noise levels, and parameters of the reverse diffusion process 840 of the diffusion model are updated based on the comparison. Finally, an image decoder 850 decodes the denoised image features 845 to obtain an output image 855 in pixel space 810. In some cases, an output image 855 is created at each of the various noise levels. The output image 855 can be compared to the original image 805 to train the reverse diffusion process 840.

In some cases, image encoder 815 and image decoder 850 are pre-trained prior to training the reverse diffusion process 840. In some examples, they are trained jointly, or the image encoder 815 and image decoder 850 and fine-tuned jointly with the reverse diffusion process 840.

The reverse diffusion process 840 can also be guided based on a text prompt 860, or another guidance prompt, such as an image, a layout, a segmentation map, etc. The text prompt 860 can be encoded using a text encoder 865 (e.g., a multimodal encoder) to obtain guidance features 870 in guidance space 875. The guidance features 870 can be combined with the noisy features 835 at one or more layers of the reverse diffusion process 840 to ensure that the output image 855 includes content described by the text prompt 860. For example, guidance features 870 can be combined with the noisy features 835 using a cross-attention block within the reverse diffusion process 840.

Figure 9:
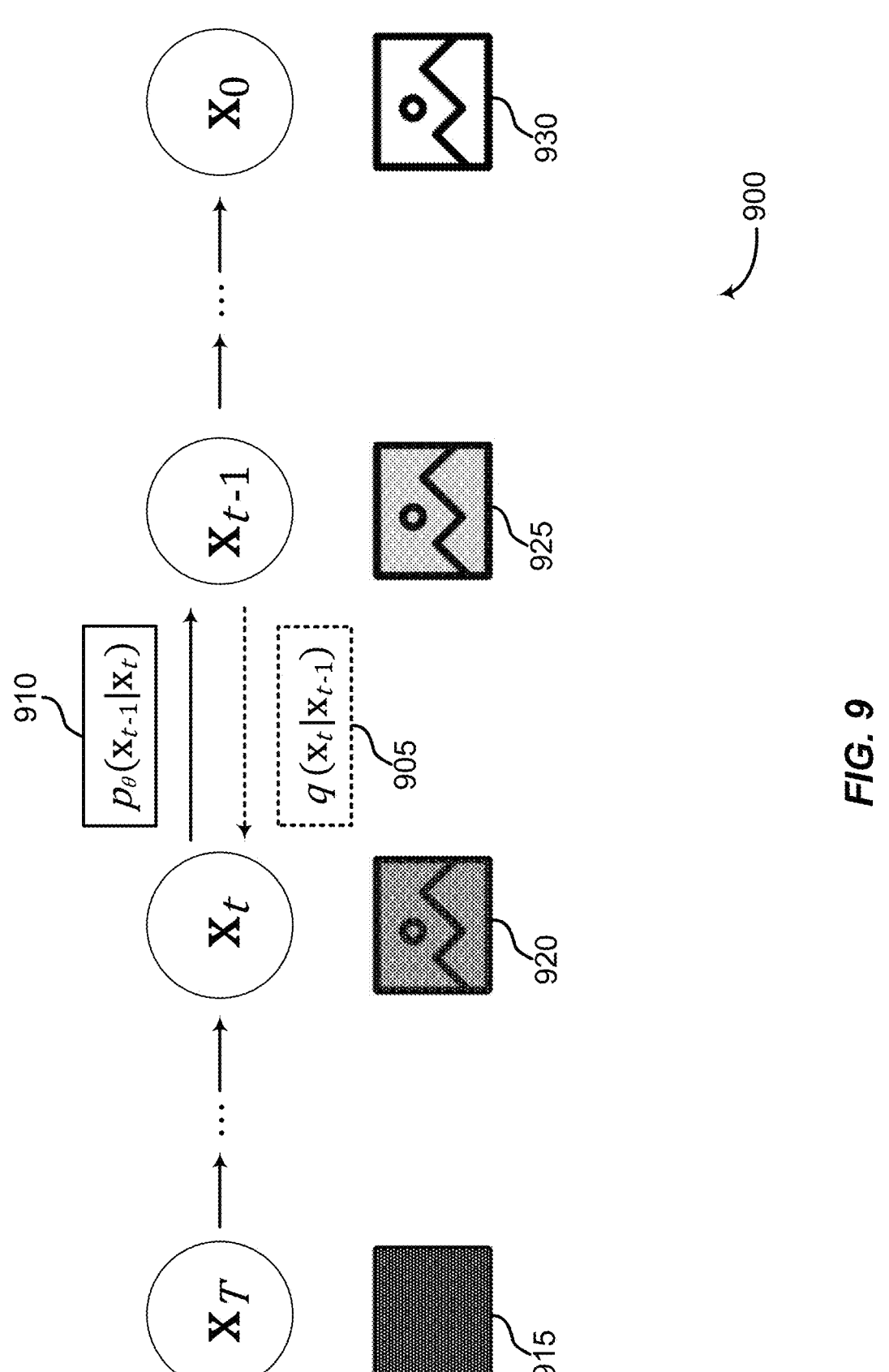
FIG. 9 shows an example of a diffusion process according to aspects of the present disclosure.

FIG. 9 shows a diffusion process 900 according to aspects of the present disclosure. As described above with reference to FIGS. 2-4, a diffusion model can include both a forward diffusion process 905 for adding noise to an image (or features in a latent space) and a reverse diffusion process 910 for denoising the images (or features) to obtain a denoised image. The forward diffusion process 905 can be represented as q($x_t$|$x_{t-1}$), and the reverse diffusion process 910 can be represented as p($x_{t-1}$|$x_t$). In some cases, the forward diffusion process 905 is used during training to generate images with successively greater noise, and a neural network is trained to perform the reverse diffusion process 910 (i.e., to successively remove the noise).

In an example forward process for a latent diffusion model, the model maps an observed variable $x_0$ (either in a pixel space or a latent space) intermediate variables $x_1, \ldots, x_T$ using a Markov chain. The Markov chain gradually adds Gaussian noise to the data to obtain the approximate posterior q($x_{1:T}$|$x_0$) as the latent variables are passed through a neural network such as a U-Net, where $x_1, \ldots, x_T$ have the same dimensionality as $x_0$.

The neural network may be trained to perform the reverse process. During the reverse diffusion process 910, the model begins with noisy data $x_T$, such as a noisy image 915 and denoises the data to obtain the p($x_{t-1}$|$x_t$). At each step t−1, the reverse diffusion process 910 takes $x_t$, such as first intermediate image 920, and t as input. Here, t represents a step in the sequence of transitions associated with different noise levels. The reverse diffusion process 910 outputs $x_{t-1}$, such as second intermediate image 925 iteratively until $x_T$ is reverted back to $x_0$, the original image 930. The reverse process can be represented as:

$$p_\theta(x_{t-1} \mid x_t) := N\left(x_{t-1}; \mu_\theta(x_t, t), \sum\nolimits_\theta(x_t, t)\right). \tag{1}$$

The joint probability of a sequence of samples in the Markov chain can be written as a product of conditionals and the marginal probability:

$$x_T: \; p_\theta(x_{0:T}) := p(x_T)\prod\nolimits_{t=1}^{T} \; p_\theta(x_{t-1} \mid x_t), \tag{2}$$

where p($x_T$)=N($x_T$; 0, I) is the pure noise distribution as the reverse process takes the outcome of the forward process, a sample of pure noise, as input and $\Pi_{t=1}^{T} p_\theta(x_{t-1}|x_t)$ represents a sequence of Gaussian transitions corresponding to a sequence of addition of Gaussian noise to the sample.

At interference time, observed data $x_0$ in a pixel space can be mapped into a latent space as input and a generated data $\bar{x}$ is mapped back into the pixel space from the latent space as output. In some examples, $x_0$ represents an original input image with low image quality, latent variables $x_1, \ldots, x_T$ represent noisy images, and $\bar{x}$ represents the generated image with high image quality.

FIG. 10 shows an example of a computing device for interactive 3D aware text-to-image generation according to aspects of the present disclosure. In one aspect, computing device 1000 includes processor(s) 1005, memory subsystem 1010, communication interface 1015, I/O interface 1020, user interface component(s) 1025, and channel 1030.

In some embodiments, computing device 1000 is an example of, or includes aspects of, user device 110 and/or server 115 of FIG. 1, image processing system of FIG. 2, etc. In some embodiments, computing device 1000 includes one or more processors 1005 that can execute instructions stored in memory subsystem 1010 to receive a 3D edit input from a user, wherein the 3D edit input indicates an edit to a 3D model, generate a depth map of the 3D model based on the 3D edit input, receive a text prompt from a user, and generate an output image based on the depth map and the text prompt, wherein the output image depicts a view of the 3D model.

According to some aspects, computing device 1000 includes one or more processors 1005. In some cases, a processor is an intelligent hardware device, (e.g., a general-purpose processing component, a DSP, a CPU, a GPU, a microcontroller, an ASIC, a FPGA, a programmable logic device, a discrete gate or transistor logic component, a discrete hardware component, or a combination thereof. In some cases, a processor is configured to operate a memory array using a memory controller. In other cases, a memory controller is integrated into a processor. In some cases, a processor is configured to execute computer-readable instructions stored in a memory to perform various functions. In some embodiments, a processor includes special purpose components for modem processing, baseband processing, digital signal processing, or transmission processing.

According to some aspects, memory subsystem 1010 includes one or more memory devices. Examples of a memory device include RAM, ROM, or a hard disk. Examples of memory devices include solid state memory and a hard disk drive. In some examples, memory is used to store computer-readable, computer-executable software including instructions that, when executed, cause a processor to perform various functions described herein. In some cases, the memory contains, among other things, a BIOS which controls basic hardware or software operation such as the interaction with peripheral components or devices. In some cases, a memory controller operates memory cells. For example, the memory controller can include a row decoder, column decoder, or both. In some cases, memory cells within a memory store information in the form of a logical state.

According to some aspects, communication interface 1015 operates at a boundary between communicating entities (such as computing device 1000, one or more user devices, a cloud, and one or more databases) and channel 1030 and can record and process communications. In some cases, communication interface 1015 is provided to enable a processing system coupled to a transceiver (e.g., a transmitter and/or a receiver). In some examples, the transceiver is configured to transmit (or send) and receive signals for a communications device via an antenna.

According to some aspects, I/O interface 1020 is controlled by an I/O controller to manage input and output signals for computing device 1000. In some cases, I/O interface 1020 manages peripherals not integrated into computing device 1000. In some cases, I/O interface 1020 represents a physical connection or port to an external peripheral. In some cases, the I/O controller uses an operating system such as iOS®, ANDROID®, MS-DOS®, MS-WINDOWS®, OS/2®, UNIX®, LINUX®, or other known operating system. In some cases, the I/O controller represents or interacts with a modem, a keyboard, a mouse, a touchscreen, or a similar device. In some cases, the I/O controller is implemented as a component of a processor. In some cases, a user interacts with a device via I/O interface 1020 or via hardware components controlled by the I/O controller.

According to some aspects, user interface component(s) 1025 enable a user to interact with computing device 1000. In some cases, user interface component(s) 1025 include an audio device, such as an external speaker system, an external display device such as a display screen, an input device (e.g., a remote-control device interfaced with a user interface directly or through the I/O controller), or a combination thereof. In some cases, user interface component(s) 1025 include a GUI.

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein but is to be accorded the broadest scope consistent with the principles and novel features disclosed herein.

The described systems and methods may be implemented or performed by devices that include a general-purpose processor, a DSP, an ASIC, a FPGA or other programmable logic device, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates transfer of code or data. A non-transitory storage medium may be any available medium that can be accessed by a computer. For example, non-transitory computer-readable media can comprise RAM, ROM, electrically erasable programmable read-only memory (EEPROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

In this disclosure and the following claims, the word "or" indicates an inclusive list such that, for example, the list of X, Y, or Z means X or Y or Z or XY or XZ or YZ or XYZ. Also, the phrase "based on" is not used to represent a closed set of conditions. For example, a step that is described as "based on condition A" may be based on both condition A and condition B. In other words, the phrase "based on" shall be construed to mean "based at least in part on." Also, the words "a" or "an" indicate "at least one."

What is claimed is:

1. A method comprising:

receiving, via a combined interface of a three-dimensional (3D) modeling application and an image generation model, a 3D edit input and a text prompt, wherein the 3D edit input indicates a change to a 3D model depicting an object, the text prompt describes a scene corresponding to the 3D model, and the text prompt describes a texture for the object, and wherein the combined interface of the 3D modeling application and the image generation model comprises a modeling interface for editing the 3D model, a text interface for receiving the texture, and a preview element for displaying an output of the image generation model;

modifying, using the 3D modeling application, the 3D model based on the 3D edit input to obtain a modified 3D model;

generating a depth map of the modified 3D model;

generating, by the image generation model, an output image by denoising input noise based on the depth map and the text prompt to obtain image features representing the scene and decoding the image features to obtain the output image, wherein the output image depicts a view of the scene including the object with the texture; and displaying the output image via the preview element of the combined interface.

2. The method of claim 1, further comprising:

adding a 3D shape into the 3D model using the 3D modeling application, wherein the output image depicts the added 3D shape.

3. The method of claim 2, further comprising:

receiving the 3D edit input comprising a rotation or a translation of the 3D shape, wherein the output image is based on the 3D edit input.

4. The method of claim 2, further comprising:

displaying a plurality of 3D shapes to a user using a 3D asset interface; and receiving a selection input via the 3D asset interface, wherein the 3D shape is added based on the selection input.

5. The method of claim 1, further comprising:

generating a plurality of output images; and displaying a preview depicting each of the plurality of output images.

6. The method of claim 1, wherein the 3D model comprises a textureless model.

7. The method of claim 1, wherein the output image is generated using a reverse diffusion process.

8. The method of claim 1, wherein the output image comprises a 2D rendering of the 3D model.

9. The method of claim 1, wherein the 3D model comprises a plurality of 3D shapes, and wherein each of the 3D shapes comprises a different color.

10. The method of claim 1, further comprising:

receiving a view input; and determining a camera view of the 3D model based on the view input, wherein the depth map is based on the camera view.

11. An apparatus comprising:

at least one processor;

at least one memory storing instructions and in electronic communication with the at least one processor;

a combined interface for a three-dimensional (3D) modeling application and an image generation model, wherein the combined interface is configured to receive a 3D edit input and a text prompt, wherein the 3D edit input indicates a change to a 3D model depicting an object, the text prompt describes a scene corresponding to the 3D model, and the text prompt describes a texture for the object, wherein the combined interface of the 3D modeling application and the image generation model comprises a modeling interface for editing the 3D model, a text interface for receiving the texture, and a preview element for displaying an output of the image generation model;

the 3D modeling application configured to generate a depth map by modifying the 3D model; and the image generation model configured to generate an output image by denoising input noise based on the depth map and a text prompt to obtain image features representing the scene and decoding the image features to obtain the output image, wherein the output image depicts a view of a scene including the object with the texture.

12. The apparatus of claim 11, further comprising:

a 3D asset interface configured to display a plurality of 3D shapes, receive a selection input, and add a 3D shape into the 3D model.

13. The apparatus of claim 11, further comprising:

a display configured to generate a plurality of output images and display a preview of the plurality of output images, wherein the plurality of output images comprises the generated output image.

14. The apparatus of claim 11, wherein the 3D model comprises a textureless model and the output image comprises a 2D rendering of the 3D model generated using a reverse diffusion process.

15. A non-transitory computer readable medium storing code for image processing, the code comprising instructions executable by a processor to:

receive, via a combined interface of a three-dimensional (3D) modeling application and an image generation model, a 3D edit input and a text prompt, wherein the 3D edit input indicates a change to a 3D model depicting an object, the text prompt describes a scene corresponding to the 3D model, and the text prompt describes a texture for the object, and wherein the combined interface of the 3D modeling application and the image generation model comprises a modeling interface for editing the 3D model, a text interface for receiving the texture, and a preview element for displaying an output of the image generation model;

modify, using the 3D modeling application, the 3D model based on the 3D edit input to obtain a modified 3D model;

generate a depth map of the modified 3D model;

generate, using the image generation model, an output image by denoising input noise based on the depth map and the text prompt to obtain image features representing the scene and decoding the image features to obtain the output image, wherein the output image depicts a view of the scene including the object with the texture; and display the output image via the preview element of the combined interface.

16. The non-transitory computer readable medium of claim 15, the code further comprising instructions executable by the processor to:

display a plurality of 3D shapes;

receive a selection input corresponding to a 3D shape selected from the plurality of 3D shapes; and add the 3D shape into the 3D model based on the selection input, wherein the output image depicts the added 3D shape.

\* \* \* \* \*